(12) United States Patent
Benson-Sargent et al.

(10) Patent No.: US 8,784,518 B2
(45) Date of Patent: Jul. 22, 2014

(54) METHOD OF MAKING POLYURETHANE FOAM

(75) Inventors: Elizabeth Anna Benson-Sargent, St. Paul Park, MN (US); David R. Dow, West Lakeland, MN (US); Grady A. Dunham, Waterville, IA (US); Douglas E. Earl, Saint Paul, MN (US); Jeffrey P. Lenzendorf, Eastman, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 241 days.

(21) Appl. No.: 13/347,994

(22) Filed: Jan. 11, 2012

(65) Prior Publication Data

US 2012/0180400 A1  Jul. 19, 2012

Related U.S. Application Data

(60) Provisional application No. 61/433,409, filed on Jan. 17, 2011.

(51) Int. Cl.

| | |
|---|---|
| *B24D 3/00* | (2006.01) |
| *B24D 11/00* | (2006.01) |
| *B24D 18/00* | (2006.01) |
| *B24D 3/02* | (2006.01) |
| *C09K 3/14* | (2006.01) |
| *B24B 1/00* | (2006.01) |
| *C09C 1/68* | (2006.01) |

(52) U.S. Cl.
USPC ................... 51/296; 51/293; 51/298

(58) Field of Classification Search
USPC ............................. 51/296, 293, 298
See application file for complete search history.

(56) References Cited

U.S. PATENT DOCUMENTS

| 4,050,896 | A | * | 9/1977 | Raffel et al. ................... 436/183 |
| 4,157,427 | A | | 6/1979 | Ferber |
| 4,312,820 | A | | 1/1982 | Arnold |
| 5,055,272 | A | | 10/1991 | Wheeler |
| 5,296,517 | A | * | 3/1994 | Wetzig et al. .................. 521/155 |
| 5,846,461 | A | * | 12/1998 | Collins et al. ................ 264/45.3 |
| 6,271,275 | B1 | | 8/2001 | Malwitz |
| 6,280,692 | B1 | * | 8/2001 | Bartlett, Jr. ................... 422/131 |
| 7,399,437 | B2 | | 7/2008 | James |
| 7,435,364 | B2 | * | 10/2008 | James et al. ................. 264/45.4 |
| 2003/0158280 | A1 | | 8/2003 | Daunch |
| 2004/0082676 | A1 | * | 4/2004 | Douglas et al. ............... 521/155 |

FOREIGN PATENT DOCUMENTS

EP      0 565 974      10/1993

OTHER PUBLICATIONS

International Search Report, PCT/US2012/020893, mailed Apr. 13, 2012, 4 pages.

* cited by examiner

*Primary Examiner* — James McDonough
(74) *Attorney, Agent, or Firm* — Kenneth B. Wood

(57) ABSTRACT

Herein are disclosed an apparatus and method for reaction injection molding of polyurethane foam. In the method, a recirculation loop containing polyols along with an effective amount of water, and a recirculation loop containing isocyanates, are each partially evacuated.

18 Claims, 1 Drawing Sheet

METHOD OF MAKING POLYURETHANE FOAM

CROSS-REFERENCE TO RELATED APPLICATION

This application claims the benefit of U.S. Provisional Patent Application No. 61/433,409, filed Jan. 17, 2011, the disclosure of which is incorporated by reference herein in its entirety.

BACKGROUND

Polyurethane foam is frequently made by reaction injection molding of polyols and isocyanates. Often, one or more physical blowing agents, entrained gaseous nucleating agents, or the like, are used in order to achieve and/or control the development of voids (cells) to form a foamed structure.

SUMMARY

Herein are disclosed an apparatus and method for reaction injection molding of polyurethane foam. In the method, a recirculation loop containing polyols along with an effective amount of water, and a recirculation loop containing isocyanates, are each partially evacuated.

Thus in one aspect, herein is disclosed a method of reaction injection molding a polyurethane foam, comprising recirculating a polyol mixture in a first partially evacuated recirculation loop, wherein the polyol mixture comprises from about 0.5% to about 4% by weight of water; recirculating an isocyanate mixture in a second partially evacuated recirculation loop; impingement mixing a portion of the polyol mixture with a portion of the isocyanate mixture to form a reaction mixture; injecting the reaction mixture into a mold; and, allowing the reaction mixture to react to form a polyurethane foam.

Thus in another aspect, herein is disclosed a polyurethane foam article comprising a reaction injection molded, water-blown polyurethane foam comprising a density of less than about 0.1 grams per cubic centimeter and an average cell size of less than about 0.02 mm.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

DETAILED DESCRIPTION

Figure 1:
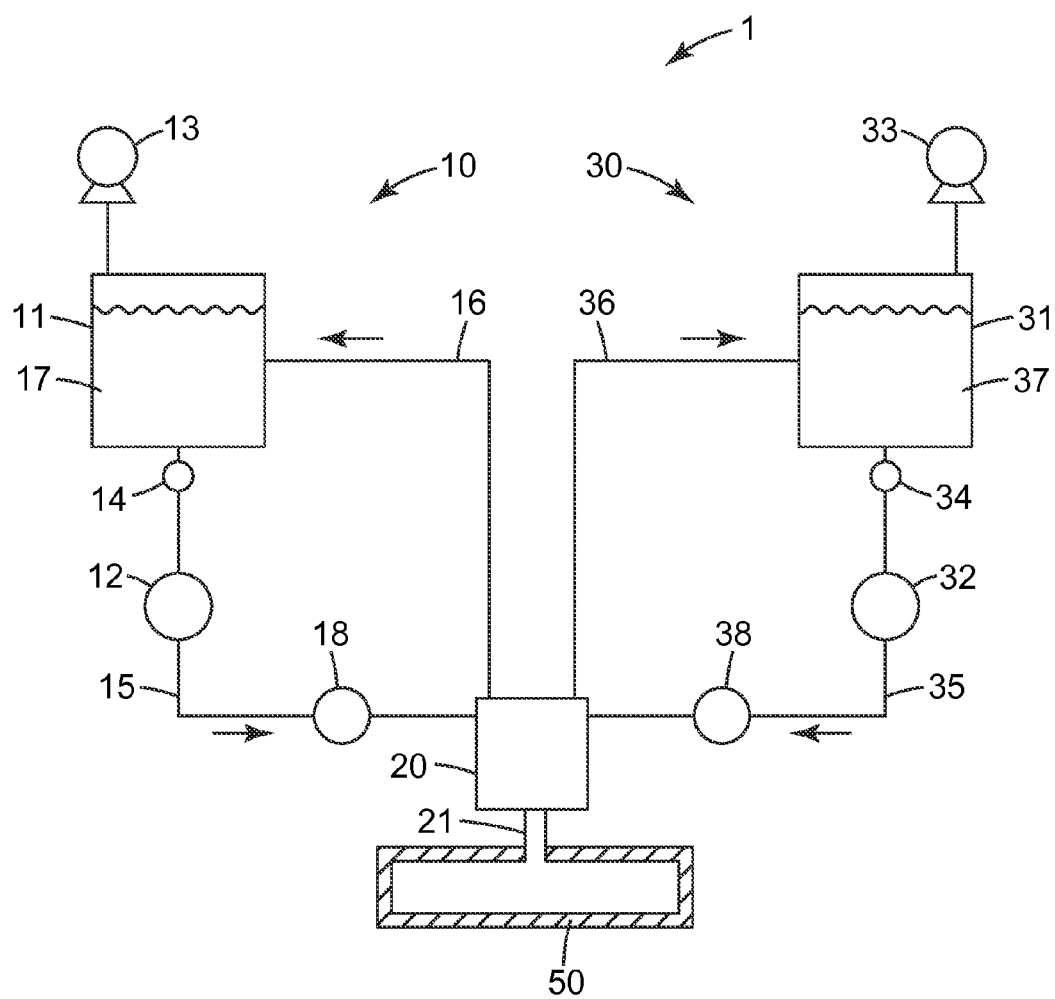
FIG. 1 is a diagrammatic view of an apparatus and method as disclosed herein.

Reaction injection molding to make polyurethanes is known by those of skill in the art to involve impingement mixing of polyols with isocyanates under high pressure and injecting the resulting mixture into a mold. Shown in FIG. 1 is an exemplary apparatus 1 which may be used for this purpose. In brief, apparatus 1 comprises a first recirculating loop 10 which contains and recirculates polyol liquid mixture 17, and second recirculating loop 30 which contains and recirculates isocyanate liquid mixture 37. First recirculating loop 10 is defined as comprising at least first storage tank 11 (often referred to as a "day tank" by those of skill in the art), supply line (i.e., piping) 15 by which at least a portion of polyol mixture 17 from first tank 11 may be delivered to impingement mixing head 20, and return line 16 by which portions of polyol mixture 17 that are not mixed with isocyanate mixture 37 can be returned to first tank 11. Similarly, second recirculating loop 30 is defined as comprising at least second storage tank 31, supply line 35 by which at least a portion of isocyanate mixture 37 from second tank 31 may be delivered to impingement mixing head 20, and return line 36 by which portions of isocyanate mixture 37 that are not mixed with polyol mixture 17 can be returned to second tank 31.

At least a portion of polyol mixture 17 and of isocyanate mixture 37 are delivered into impingement mixing head 20, in which the polyol mixture and isocyanate mixture portions are impingement-mixed (defined herein as meaning that the portions are mixed with each other as liquid streams that are impinged on each other under high pressure (i.e., 1500 psi (10.3 MPa) or more), with consequent turbulence). Such impingement mixing, and reaction injection molding in general, is also characterized by the fact that the liquid reactants are mixed with each other over a very short time scale (e.g., within one second or less) and then quickly (e.g., within a few seconds after being mixed) delivered into a mold. Those of skill in the art will thus appreciate the difference between such impingement mixing, as used in reaction injection molding, and other mixing processes as may be used e.g. in other polyurethane foam production processes that do not fall under the category of reaction injection molding.

The resulting mixture of polyols and isocyanates can then be injected (e.g., by way of nozzle 21) into mold 50, within which the isocyanates and polyols will react with each other to form polyurethane foam. In at least some embodiments, the mixture of polyols and isocyanates may be chosen to fill only a certain percentage (e.g., 5-20 volume %) of the interior volume of the mold. The development of void spaces and consequent formation of a foamed structure will then provide that the polyurethane expands to fill the interior of mold 50 to form a so-called bun which assumes the shape of the mold interior. As such, the reaction injection formation of a polyurethane foam as disclosed herein can be distinguished from the reaction injection formation of relatively dense polyurethane materials (e.g., high density foams and non-foamed polyurethanes as may be commonly used in structural parts, gaskets and the like), in which comparatively little expansion (or even slight shrinkage) may occur during the reacting and molding process.

Recirculation loops 10 and 30 may comprise any suitable equipment, components and the like that are well-known as being useful in reaction injection molding. For example, recirculation loops 10 and 30 may contain metering pumps 18 and 38, respectively, which may be used to deliver desired amounts of the respective liquids to impingement mixing head 20 (through supply lines 15 and 35, respectively). Such metering pumps often comprise positive displacement pumps (e.g., lance metering cylinders). Metering pumps 18 and 38 may also serve to motivate the unmixed portions of the respective liquids to be returned to tanks 11 and 31 (through return lines 16 and 36, respectively). Or, in some cases, it may be convenient to provide optional separate recirculation pumps 14 and 34 to perform at least some of this function. In some cases it may be convenient to provide optional feeder pumps 14 and 34 to assist in inputting the liquids into their respective tanks and/or removing the liquids from the respective tanks and motivating them into supply lines 15 and 35. Directions of fluid flow are shown by the arrows in FIG. 1.

Conventionally in the reaction injection molding of polyurethane foam, physical blowing agents and/or gaseous nucleation agents (e.g., volatile liquids such as alkanes, haloalkanes, and the like; and/or gases such as air, carbon dioxide or nitrogen, etc.) are employed (e.g., injected into one or both of the liquid mixtures) in order to promote and/or control the development of void spaces (e.g., cells) that is characteristic of a foamed material. Such approaches are described e.g. in U.S. Pat. No. 4,147,427 to Ferber. In sharp contrast, in the presently disclosed method, not only are no physical blowing agents and/or gaseous nucleation agents added to (i.e., mixed with, injected into, entrained in, etc.) either of the liquid mixtures or otherwise injected into the recirculation loops, but vacuum pumps 13 and 33 are employed to partially evacuate recirculation loops 10 and 30 respectively. A partially evacuated recirculation loop is defined as one in which one or more vacuum pumps are used to reduce the pressure in the day tank of the recirculation loop by an increment (amount) of at least 100 Torr, but no more than 500 Torr. The pressure reduction is measured from the ambient pressure in the surroundings in which the reaction injection molding apparatus is operated. That is, if the surrounding ambient pressure happens to be 760 Torr (i.e., one standard atmosphere), and the pressure in the day tank is reduced by an increment of 100 Torr, the pressure in the day tank would be 660 Torr. In various embodiments, the pressure reduction increment may be at least about 150 Torr, at least about 200 Torr, or at least about 250 Torr. In further embodiments, the pressure reduction increment may be at most about 400 Torr, or at most about 300 Torr. First and second day tanks may both be partially evacuated by the same pressure reduction increment, or by different increments.

While vacuum pumps 13 and 33 may be fluidly connected to any suitable portion of recirculating loops 10 and 30 that can achieve the desired effect, it may be convenient to fluidly connect them to a vertically upper portion of tanks 11 and 31 respectively, so that they can easily remove volatile and/or gaseous components from the headspaces of tanks 11 and 31. (While two separate vacuum pumps are shown in the exemplary design of FIG. 1, a single pump of sufficient pumping capacity might be used to partially evacuate both recirculation loops. Multiple vacuum pumps may be used for each tank if desired).

Those of ordinary skill will appreciate that the above-described apparatus and method (which excludes the addition of any physical blowing agent and/or gaseous nucleation agent and furthermore applies a vacuum to remove a substantial portion of any such gaseous materials, e.g. air, as might normally be present e.g. in the headspace of tanks 11 and 31) generally lacks any mechanism for developing void spaces in the resulting reaction injection molded polyurethane. However, in using the above-described apparatus and process, an effective amount of liquid water is included in polyol mixture 17 (an effective amount being defined herein as meaning that the water is present at least at about 0.5 wt. % of the total polyol mixture), which water serves as a chemical blowing agent by way of chemically reacting with isocyanate groups (upon mixing of polyol mixture 17 with isocyanate mixture 37) to generate carbon dioxide gas. Those of skill in the art will thus appreciate that liquid water as used herein is not a physical blowing agent or a gaseous nucleation agent. Those of skill in the art will further appreciate that the condition that no physical blowing agents and/or gaseous nucleation agents are added to either polyol mixture 17 or isocyanate mixture 37, does not preclude the in situ formation of carbon dioxide gas by way of the isocyanate-water reaction.

It has been discovered that the use of liquid water in the polyol mixture as a chemical blowing agent, in the absence of any physical blowing agent and/or gaseous nucleation agent, can provide an acceptable reaction injection molded polyurethane foam. (Those of skill in the art will appreciate that such a water-blown polyurethane foam may be distinguished from foams achieved with physical blowing agents and/or gaseous nucleation agents, e.g. by the detection of certain urea linkages and attached groups, formed by the reaction of water and N=C=O groups). It has further been discovered that in this use of liquid water as a chemical blowing agent in the absence of any added physical blowing agent and/or gaseous nucleation agent, the partial evacuation of both of the recirculation loops (e.g., by the operation of vacuum pumps fluidly connected to the headspace of the tanks holding the polyol mixture and the isocyanate mixture) can surprisingly provide enhanced control of the development of voids in the resulting polyurethane foam. Specifically, such partial evacuation may minimize the occurrence of voids larger than about 1.0 mm in length, or even the occurrence of voids larger than about 0.5 mm in length. In this regard, void length means the largest dimension of a given void (cell) without penetrating into an adjacent cell (e.g., in the case of an open-cell foam), as obtained by visual inspection. It has been found that, particularly in production of a sanding sponge (e.g., in which abrasive layers are disposed, e.g. by coating, upon major surfaces of an article comprised of the reaction injection molded polyurethane foam), the presence of a large number of voids of over about 1.0 mm in length on the surface to be coated with the abrasive can have an undesirable cosmetic effect on the coated abrasive. Thus, in various embodiments, a reaction injection molded polyurethane foam made as disclosed herein, may have less than about one void of greater than 1.0 mm in length per cubic centimeter of the foam, or less than about one void of greater than 1.0 mm in length, per two cubic centimeters of the foam, as observed by visual inspection.

In various embodiments, the polyurethane foam as disclosed herein may comprise an average cell size of less than about 0.08 mm, less than about 0.05 mm, or less than about 0.02 mm. Average cell size is defined herein as being measured in generally similar manner to the procedure described in ASTM Test Method E112-96 as specified in 1996 (using the Heyn Lineal Intercept Procedure), noting that while this Test Method is primarily intended to be used for the measurement of grain size in metals, it has been found satisfactory for measuring cell size in the present foams.

It has still further been found that the partial evacuation of the recirculating loops can surprisingly enhance certain physical properties of the resulting polyurethane foam, in particular the strength (as measured e.g. by a Trouser Tear test) and the abrasion resistance (as measured e.g. by a TABER Abrasion test), as disclosed and described in further detail in the Examples later herein. However, it has been found that use of an pressure reduction increment of greater than about 500 Torr may (e.g. by excessive removal of certain volatile components) result in the foam having poor physical properties.

Polyol mixture 17 may comprise any suitable polyol and/or mixtures thereof, along with any other suitable component (and, of course, an effective amount of liquid water as discussed herein). In various embodiments, suitable polyols may include polyester polyols, polyether polyols, polycaprolactone polyols, and mixtures thereof. The hydrocarbon chain of the polyols can have saturated or unsaturated bonds and substituted or unsubstituted aromatic and cyclic groups. Polyether polyols may be preferred in some cases for the enhanced flexibility that they may provide. Suitable polyether polyols may include, but are not limited to, polytetramethylene ether glycol ("PTMEG"), polyethylene propylene glycol, polyoxypropylene glycol, and mixtures thereof. Suitable polyester polyols include, but are not limited to, polyethylene adipate glycol, polybutylene adipate glycol, polyethylene propylene adipate glycol, o-phthalate-1,6-hexanediol, poly(hexamethylene adipate)glycol, and mixtures thereof. Suitable polycaprolactone polyols may include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. Polyols based on, or derived from, glycerol and the like (e.g., produced by condensing multiple glycerol molecules together to form polyethers) may be used if desired. Suitable polyols may range from e.g. diols, triols, to tetraols, or even higher.

Suitable polyols may thus include, but are not limited to, ethylene glycol, diethylene glycol, polyethylene glycol, propylene glycol, polypropylene glycol, lower molecular weight polytetramethylene ether glycol, 1,3-bis(2-hydroxyethoxy)benzene, 1,3-bis-[2-(2-hydroxyethoxy)ethoxy]benzene, 1,3-bis-{2-[2-(2-hydroxyethoxy)ethoxy]ethoxy}benzene, 1,4-butanediol, 1,5-pentanediol, 1,6-hexanediol, resorcinol-di-(beta-hydroxyethyl)ether, hydroquinone-di-(beta-hydroxyethyl)ether, and mixtures thereof. Any of these may be blended e.g. with any of the above-discussed polyols, and may serve, as may any other suitably reactive materials, as chain extenders and the like. The polyol mixture may include any other suitable compounds that comprise active hydrogen atoms (that can react with N=C=O groups), as desired.

As mentioned, the polyol mixture will contain an effective amount of water to achieve the desired formation of voids in the reaction injection molded polyurethane. In this context, an effective amount of water means that the polyol mixture contains at least 0.5 wt. % water. Those of skill in the art will appreciate that this will distinguish such an effective amount of water from such trace amounts of water (e.g., 0.2 wt. % or less) as may be present e.g. in some of the above-listed polyols due to their relative hydrophilicity. In various embodiments, the polyol mixture comprises at least about 0.8 wt. % water, at least about 1.2 wt. % water, or at least about 1.4 wt. % water. In further embodiments, the polyol mixture comprises at most about 4.0 wt. % water, at most about 3.0 wt. % water, at most about 2.0 wt. % water, or at most about 1.6 wt. % water.

Those of ordinary skill will appreciate that any other suitable component may be added to the polyol mixture. Such components may include e.g. one or more catalysts as are customarily used to promote the reaction of isocyanates and hydroxyls. Such components may include e.g. pigments, e.g. particulate pigments (in which case sufficient agitation of the day tanks may be performed so as to keep such pigments adequately dispersed). Such components may include e.g. surfactants which may enhance the control of the void formation. Suitable surfactants may include e.g. alkyleneoxide siloxane surfactants (e.g., polyalkyleneoxide-methylsiloxane copolymers), present in various exemplary embodiments at about 0.5-3 wt. %, or at about 0.8-1.4 wt. %. Such components may include e.g. antioxidants, flame retardants, stabilizers, fillers, and the like. Any or all of such additional components may be used alone or in combination.

As disclosed herein, the polyol mixture (and, the isocyanate mixture) may be substantially free of polymeric microspheres, in particular expandable microspheres. Such polymeric microspheres are disclosed and described in detail in column 5 lines 22-46 of U.S. Pat. No. 7,399,437 to James, and in column 5 line 57 through column 6 line 24 of U.S. Pat. No. 7,435,364 to James, both of these sections of these patents being incorporated by reference herein for this purpose. Those of ordinary skill will appreciate that as used here and in other contexts herein, the term "substantially free of" does not preclude the presence of some extremely low, e.g. 0.1 wt. % or less, amount of material, as may occur e.g. when using large scale production equipment subject to customary cleaning procedures.

Isocyanate mixture 37 may comprise any isocyanate-functional molecules and/or mixtures thereof, along with any other suitable components. Polyisocyanates, e.g. diisocyanates, triisocyanates, and isocyanates of still higher functionality, may be used. Some number of monofunctional isocyanates may be used if desired for particular purposes. Any such isocyanates may be aliphatic or aromatic, or mixtures thereof. Suitable isocyanates include, but are not limited to, methylene bis 4,4' cyclohexylisocyanate, cyclohexyl diisocyanate, isophorone diisocyanate, hexamethylene diisocyanate, propylene-1,2-diisocyanate, tetramethylene-1,4-diisocyanate, 1,6-hexamethylene-diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethylcyclohexane, methyl cyclohexylene diisocyanate, triisocyanate of hexamethylene diisocyanate, triisocyanate of 2,4,4-trimethyl-1,6-hexane diisocyanate, uretdione of hexamethylene diisocyanate, ethylene diisocyanate, 2,2,4-trimethylhexamethylene diisocyanate, 2,4,4-trimethylhexamethylene diisocyanate, dicyclohexylmethane diisocyanate and the like.

In some embodiments, the isocyanate mixture includes methylene diphenylene diisocyanate (commonly referred to as MDI), which may be primarily diphenylmethane 4,4'-diisocyanate but may also include other isomers, dimers, oligomers, and/or higher homologues thereof. In particular embodiments, the isocyanate mixture may be comprised predominately of the material known as polymeric MDI, which is known by those of skill in the art to comprise a mixture of MDI isomers and higher homologues (for example, polymeric MDI often comprises approximately 50 wt. % MDI, approximately 30 wt. % tri-isocyanate homologue, approximately 10 wt. % tetra-isocyanate homologue, approximately 5 wt. % penta-isocyanate homologue, and approximately 5 wt. % higher homologues. In some embodiments, the isocyanate mixture is substantially free of toluene diisocyanate (TDI), and isomers and oligomers thereof. In specific embodiments, the only isocyanates in the isocyanate mixture are MDI and/or oligomers and/or prepolymers etc. thereof.

Those of ordinary skill will appreciate that the polyol mixture and the isocyanate mixture may each be chosen to have a suitably low viscosity to facilitate reaction injection molding. It will further be appreciated that the amounts of polyols and isocyanates, and the amounts of reactive hydrogens on the polyols (as well as on the water, and also on any other molecules if present) and amounts of N═C═O groups on the isocyanates, can be chosen according to well-established principles to provide the proper stoichiometric ratio of ingredients to achieve sufficiently high molecular weight polyurethane product.

Figure 2:
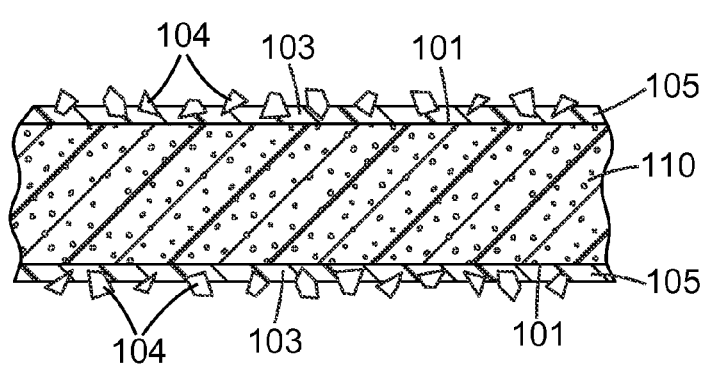
FIG. 2 is a side cross sectional view of an article that can be made as disclosed herein.

The above-described process has been found to be particularly useful for making polyurethane articles for the production of so-called abrasive sponges (e.g., sanding sponges). Accordingly, the polyurethane foam bun produced as described above, can be subdivided (e.g., cut using any suitable method) into smaller articles each of which comprises first and second oppositely-facing major surfaces. An abrasive coating can then be disposed onto the first and second oppositely-facing major surfaces (and, the articles can then be still further subdivided if desired) to produce abrasive sponges. An exemplary abrasive sponge 100 is shown in FIG. 2, and comprises main body 110 comprised of a reaction injection molded open-cell polyurethane foam, with major surfaces 101 each comprising an abrasive layer 103 comprising (in the exemplary illustration of FIG. 2) a coating 105 comprising abrasive particles 104. Abrasive layers 103 may of course be formed by any suitable method known to those of ordinary skill.

As mentioned above, the polyurethane foam as formed herein is an open-cell foam, which those of ordinary skill will recognize as meaning that the majority of the cells (voids) are interconnected rather than being isolated as in a closed-cell foam. Such an open-cell foam, in comparison to a closed-cell foam, may advantageously offer enhanced flexibility which may render abrasive sponge 100 suitable for hand sanding of curved surfaces, corners and the like. (Those of skill will recognize that the terminology of an abrasive "sponge" results primarily from the shape and texture of the article and does not signify or require that the polyurethane foam actually comprises significant capability to absorb liquids such as water). In various embodiments, the density of the reaction injection molded polyurethane foam may range between e.g. 0.03 and 0.10 grams per cubic centimeter. Those of ordinary skill will thus appreciate that such materials are of much lower density than many conventional reaction injection molded polyurethane foams (e.g., as used for automobile panels, structural parts and the like), which often comprise a density in the range of 0.7-0.9 grams per cubic centimeter. In various embodiments, the reaction injection molded polyurethane foam may comprise a Trouser Tear maximum load of at least about 2 pounds force (about 9 Newtons), or at least about 3 pounds force (about 13.5 Newtons), as measured e.g. in like manner to that described in ASTM Test Method D3574-05 as specified in 2005. In various embodiments, the reaction injection molded polyurethane foam may comprise a TABER Abrasion of less than about 300 (milligrams weight loss), or less than about 200 milligrams weight loss (as measured e.g. in like manner to that described in ASTM Test Method G195-08 as specified in 2008).

LIST OF EXEMPLARY EMBODIMENTS

Embodiment 1. A method of reaction injection molding a polyurethane foam, comprising: recirculating a polyol mixture in a first partially evacuated recirculation loop, wherein the polyol mixture comprises from about 0.5% to about 4% by weight of water; recirculating an isocyanate mixture in a second partially evacuated recirculation loop; impingement mixing a portion of the polyol mixture with a portion of the isocyanate mixture to form a reaction mixture; injecting the reaction mixture into a mold; and, allowing the reaction mixture to react to form a polyurethane foam.

Embodiment 2. The method of embodiment 1 wherein the first partially evacuated recirculation loop comprises at least a first storage tank and a first metering pump and a first vacuum pump, and is fluidly connected to an impingement mixing head.

Embodiment 3. The method of embodiment 2 wherein the second partially evacuated recirculation loop comprises at least a second storage tank and a second metering pump and a second vacuum pump, and is fluidly connected to the impingement mixing head.

Embodiment 4. The method of embodiment 3 wherein the first and second metering pumps serve to recirculate the polyol mixture and the isocyanate mixture, respectively, or wherein the first and second recirculation loops each comprise a recirculation pump that is separate from the metering pump of the loop.

Embodiment 5. The method of any of embodiments 3-4 wherein the first and second vacuum pumps are operated so that the pressure in the first and second storage tanks is reduced by an increment of from about 150 Torr to about 300 Torr.

Embodiment 6. The method of any of embodiments 3-5 wherein the first and second vacuum pumps are respectively fluidly connected to the headspace of the first and second storage tanks.

Embodiment 7. The method of any of embodiments 3-6 wherein the first and second vacuum pumps are separate vacuum pumps or wherein they comprise a single vacuum pump that is fluidly connected to both the first and second storage tanks.

Embodiment 8. The method of any of embodiments 1-7 with the proviso that no physical blowing agent or gaseous nucleation agent is added to the polyol mixture or to the isocyanate mixture or is injected into either of the first or second recirculation loops.

Embodiment 9. The method of any of embodiments 1-8 with the proviso that both the polyol mixture and the isocyanate mixture are substantially free of polymeric microspheres.

Embodiment 10. The method of any of embodiments 1-9 wherein the polyurethane foam comprises an open-celled polyurethane foam with an average cell size of less than about 0.02 mm.

Embodiment 11. The method of any of embodiments 1-10 wherein the polyurethane foam comprises less than about one void of length greater than 1.0 mm, per cubic centimeter of the polyurethane foam.

Embodiment 12. The method of any of embodiments 1-11 wherein the polyurethane foam comprises a density of between about 0.03 grams/cc and about 0.10 grams/cc.

Embodiment 13. The method of any of embodiments 1-12 wherein the reaction mixture is injected into the mold so as to fill about 10 volume % or less of the interior of the mold.

Embodiment 14. The method of any of embodiments 1-13 wherein the polyurethane foam comprises a molded bun in the shape of the mold, and wherein the method further comprises cutting the molded bun into smaller articles each article comprising first and second oppositely-facing major surfaces.

Embodiment 15. The method of embodiment 14 further comprising disposing an abrasive layer on the first and second major surfaces of each article to form an abrasive sponge.

Embodiment 16. The method of any of embodiments 1-15 wherein the polyol mixture comprises from about 1.2 wt. % to about 1.6 wt. % of water.

Embodiment 17. The method of any of embodiments 1-16 wherein the isocyanate mixture is substantially free of toluene diisocyanate and oligomers and prepolymers thereof.

Embodiment 18. The method of any of embodiments 1-17 wherein the polyurethane foam comprises a TABER abrasion of less than about 300 milligrams weight loss.

Embodiment 19. A polyurethane foam article comprising a reaction injection molded, water-blown polyurethane foam comprising a density of less than about 0.1 grams per cubic centimeter and an average cell size of less than about 0.02 mm.

Embodiment 20. The polyurethane foam article of embodiment 19, wherein the article comprises less than about one void of length greater than 1.0 mm, per cubic centimeter of the polyurethane foam.

Embodiment 21. The polyurethane foam article of any of embodiments 19-20, wherein the article comprises first and second major surfaces each with an abrasive layer disposed thereon.

Embodiment 22. The polyurethane foam article of any of embodiments 19-21, wherein the article is produced according to the method of any of embodiments 1-18.

EXAMPLES

Apparatus

A reaction injection molding apparatus was constructed of a type generally similar to the design shown in FIG. 1. The apparatus comprised first and second recirculation loops each comprising a day tank of nominal capacity 60 gallons, with a rotary vane vacuum pump (obtained from Busch Inc., Virginia Beach, Va., under the trade designation R5 Type RA0010) being fluidly connected to the upper portion of each tank. Each day tank was jacketed to allow for temperature control and comprised a mechanical agitator comprising paddles. Each recirculation loop further comprised a feeder pump (located in the piping adjacent the tank outlet, to assist in inserting and/or removing liquid from the tank), and a metering pump. The feeder pumps were gear pumps of 3-5 horsepower, of the type obtainable from the Viking Pump, Inc., of Cedar Falls, Iowa. The metering pump for the isocyanate mixture tank was a Rexroth 28 cc/rev high pressure metering pump (available from Bosch-Rexroth, of Hoffman Estates, Ill.) driven by a 20 HP motor controlled by an Allen Bradley Powerflex variable speed drive; the metering pump for the polyol mixture tank was a Rexroth 55 cc/rev high pressure metering pump driven by a 40 HP motor controlled by way of an Allen Bradley Powerflex variable speed drive. Each recirculation loop comprised a supply line connected to a common impingement mixing head (obtained from the Cannon Group, Cranberry Township, Pa., under the trade designation FPL-HP-24). A 1.25 inch (3.2 cm) diameter outlet nozzle was mounted on the impingement mixing head and which fed the mixed materials through a short rubber tube into a heatable metal mold of approximately 2'×2'×4' (0.61× 0.61×1.22 meters) in size. Each recirculation loop comprised a return line leading from the impingement mixing head back to the tank. The apparatus comprised piping, valving, heat exchangers, filters, gauges, control equipment, and so on, as are commonly used in accordance with well-established principles of operation of reaction injection molding apparatus.

Example 1

Approximately 50 gallons (190 L) of an isocyanate mixture (containing predominately polymeric MDI) was loaded into one of the day tanks by way of the feeder pump. The tank was filled from the bottom up to minimize entrainment of air. Approximately 50 gallons (190 L) of a polyol mixture was similarly loaded into the other tank. The polyol mixture was estimated to contain approximately 93 wt. % glycerol-based polyol, approximately 1-5 wt. % 1,4-butanediol, approximately 1-5 wt. % ethylene glycol, approximately 1.4% water, approximately 1.0 wt. % alkyleneoxide siloxane surfactant, and an unrecorded amount of pigment. Each amount of liquid was estimated to occupy approximately 85-90 volume % of its tank, with a headspace of approximately 10-15 volume % of the tank capacity remaining in the upper portion of the tank. The polyol liquid mixture was slowly stirred with the agitator, in such manner as to minimize any entrainment of air into the liquid. It was not found necessary to stir the isocyanate liquid mixture since it did not contain any suspended materials such as pigment. The pumps were operated to recirculate each liquid mixture throughout its respective recirculation loop. The vacuum pump of the first recirculation loop was operated to remove gaseous and/or vaporous components from the head space of the first day tank (containing the isocyanate mixture) so as to reduce the pressure in that day tank by an increment of approximately 258 Torr. (Thus, although the exact ambient pressures were not recorded, if the ambient pressure had been one standard atmosphere or 760 Torr, the pressure in the day tank would have been reduced to approximately 500 Torr). The vacuum pump of the second recirculation loop was operated to remove gaseous and/or vaporous components from the head space of the second day tank (containing the polyol mixture) so as to reduce the pressure in that day tank by an increment of approximately 155 Torr. The isocyanate mixture tank was held at approximately 24 degrees C. while the polyol mixture tank was held at approximately 35 degrees C. The system was allowed to equilibrate for approximately 1 hour.

After this, the apparatus was operated to withdraw a portion of each liquid mixture from its respective recirculating loop and to inject the liquid portions into the impingement mixing head in which they were mixed together. The liquids were mixed at a ratio of approximately 44 parts (by weight) isocyanate mixture to about 100 parts polyol mixture. The pressure under which the liquids were mixed (as developed by the metering pumps) was estimated to be in the range of approximately 2000 psi (13.8 MPa). The mixed liquid portions were ejected through the nozzle and tube into the mold (which was heated to approximately 38 degrees C.), and were typically used to fill approximately 8-10% of the total mold interior volume within about 30 seconds (at a feed rate of approximately 1.3 kg per second). The mold lid was then applied and approximately 30 minutes allowed for reacting of the ingredients. The lid was then removed and the molded bun removed. The density of the foam (taken from interior portions of the bun) was approximately 0.09 grams per cubic centimeter.

Comparative Example 1

Comparative Example 1 was performed in similar manner as example 1 except that vacuum pumps were not used to partially evacuate the recirculation loops (i.e., with the day tanks thus remaining generally at ambient atmospheric pressure).

Results

The results of characterizing the foam produced in Example 1 and in Comparative Example 1 are shown in Table 1. Foam samples were taken from interior portions of the bun so as to avoid any skin that might be present on the outer surface of the bun where the bun had been in contact with the mold surface. TABER Abrasion data was measured in generally similar manner to the procedure described in ASTM Test Method G195-08 as specified in 2008. Trouser Tear data was measured in generally similar manner to the procedure described in ASTM Test Method D3574-05 as specified in 2005. (Foam samples were processed so that the tear plane was generally normal to the rise direction of the molded bun, i.e., was generally normal to the vertical direction of the mold in which the bun was formed). Average cell sizes for the foam samples were measured in generally similar manner to the procedure described in ASTM Test Method E112-96 as specified in 1996 (using the Heyn Lineal Intercept Procedure). It was also noted that the Comparative Example 1 foam samples exhibited a significantly observable number of large voids (of a length estimated to be at least approximately 1.0 mm, and which could be easily seen by the naked eye). In contrast, the Example 1 foam samples appeared to contain an obviously much smaller (negligible) number of such large voids.

TABLE 1

| Example | Trouser Tear (max load, # force) | TABER Abrasion (mg. weight loss) | Average Cell Size (mm) |
|---|---|---|---|
| Example 1 | 2.8 | 200 | 0.017 |
| Comparative Example 1 | 2.0 | 450 | 0.016 |

The compositions, process conditions, parameters and properties described in the above Examples section are representative examples from a large number of experiments. As such, they are intended solely to be illustrative, rather than predictive, and have been supplied for clarity of understanding only. No unnecessary limitations are to be understood therefrom. All quantitative values in the Examples section are understood to be approximate in view of the commonly known tolerances involved in the procedures used.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather extends at least to the structures described by the language of the claims, and the equivalents of those structures. To the extent that there is a conflict or discrepancy between this specification and the disclosure in any document incorporated by reference herein, this specification will control.

What is claimed is:

1. A method of reaction injection molding a polyurethane foam, comprising:
    recirculating a polyol mixture in a first partially evacuated recirculation loop,
        wherein the polyol mixture comprises from about 0.5% to about 4% by weight of water;
    recirculating an isocyanate mixture in a second partially evacuated recirculation loop;
    impingement mixing a portion of the polyol mixture with a portion of the isocyanate mixture to form a reaction mixture;
    injecting the reaction mixture into a mold;
    and,
    allowing the reaction mixture to react to form a polyurethane foam.

2. The method of claim 1 wherein the first partially evacuated recirculation loop comprises at least a first storage tank and a first metering pump and a first vacuum pump, and is fluidly connected to an impingement mixing head.

3. The method of claim 2 wherein the second partially evacuated recirculation loop comprises at least a second storage tank and a second metering pump and a second vacuum pump, and is fluidly connected to the impingement mixing head.

4. The method of claim 3 wherein the first and second metering pumps serve to recirculate the polyol mixture and the isocyanate mixture, respectively, or wherein the first and second recirculation loops each comprise a recirculation pump that is separate from the metering pump of the loop.

5. The method of claim 3 wherein the first and second vacuum pumps are operated so that the pressure in the first and second storage tanks is reduced by an increment of from about 150 Torr to about 300 Torr.

6. The method of claim 5 wherein the first and second vacuum pumps are respectively fluidly connected to the headspace of the first and second storage tanks.

7. The method of claim 6 wherein the first and second vacuum pumps are separate vacuum pumps or wherein they comprise a single vacuum pump that is fluidly connected to both the first and second storage tanks.

8. The method of claim 1 with the proviso that no physical blowing agent or gaseous nucleation agent is added to the polyol mixture or to the isocyanate mixture or is injected into either of the first or second recirculation loops.

9. The method of claim 1 with the proviso that both the polyol mixture and the isocyanate mixture are substantially free of polymeric microspheres.

10. The method of claim 1 wherein the polyurethane foam comprises an open-celled polyurethane foam with an average cell size of less than about 0.02 mm.

11. The method of claim 1 wherein the polyurethane foam comprises less than about one void of length greater than 1.0 mm, per cubic centimeter of the polyurethane foam.

12. The method of claim 1 wherein the polyurethane foam comprises a density of between about 0.03 grams/cc and about 0.10 grams/cc.

13. The method of claim 1 wherein the reaction mixture is injected into the mold so as to fill about 10 volume % or less of the interior of the mold.

14. The method of claim 1 wherein the polyurethane foam comprises a molded bun in the shape of the mold, and wherein the method further comprises cutting the molded bun into smaller articles each article comprising first and second oppositely-facing major surfaces.

15. The method of claim 14 further comprising disposing an abrasive layer on the first and second major surfaces of each article to form an abrasive sponge.

16. The method of claim 1 wherein the polyol mixture comprises from about 1.2 wt. % to about 1.6 wt. % of water.

17. The method of claim 1 wherein the isocyanate mixture is substantially free of toluene diisocyanate and oligomers and prepolymers thereof.

18. The method of claim 1 wherein the polyurethane foam comprises a TABER abrasion of less than about 300 milligrams weight loss.

* * * * *

UNITED STATES PATENT AND TRADEMARK OFFICE
CERTIFICATE OF CORRECTION

PATENT NO. : 8,784,518 B2
APPLICATION NO. : 13/347994
DATED : July 22, 2014
INVENTOR(S) : Benson-Sargent et al.

It is certified that error appears in the above-identified patent and that said Letters Patent is hereby corrected as shown below:

In the specification,

<u>Column 6</u>
Line 32, Delete "methlene" and insert -- methylene --, therefor.

Signed and Sealed this
Fourteenth Day of April, 2015

Michelle K. Lee
*Director of the United States Patent and Trademark Office*